US011764400B2

(12) United States Patent
Park et al.

(10) Patent No.: US 11,764,400 B2
(45) Date of Patent: Sep. 19, 2023

(54) LIGNIN GELL ELECTROLYTE, METHOD OF THE LIGNIN GELL ELECTROLYTE, AND ENERGY STORING APPARATUS INCLUDING THE LIGNIN GELL ELECTROLYTE

(71) Applicant: Research & Business Foundation Sungkyunkwan University, Suwon-si (KR)

(72) Inventors: Ho Seok Park, Suwon-si (KR); Jeong Hee Park, Suwon-si (KR); Seon Hwa Kim, Suwon-si (KR); Harpalsinh Hardevsinh Rana, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 294 days.

(21) Appl. No.: 16/686,314

(22) Filed: Nov. 18, 2019

(65) Prior Publication Data

US 2020/0220213 A1    Jul. 9, 2020

(30) Foreign Application Priority Data

Nov. 16, 2018 (KR) .................. 10-2018-0141869

(51) Int. Cl.
| | |
|---|---|
| *H01M 10/0565* | (2010.01) |
| *H01M 10/052* | (2010.01) |
| *C08H 7/00* | (2011.01) |
| *H01G 11/62* | (2013.01) |
| *H01G 11/48* | (2013.01) |
| *H01G 11/86* | (2013.01) |
| *H01G 11/56* | (2013.01) |

(52) U.S. Cl.
CPC .......... *H01M 10/0565* (2013.01); *C08H 6/00* (2013.01); *H01G 11/48* (2013.01); *H01G 11/56* (2013.01); *H01G 11/62* (2013.01); *H01G 11/86* (2013.01); *H01M 10/052* (2013.01); *H01M 2300/0085* (2013.01)

(58) Field of Classification Search
CPC ........... H01M 10/0565; H01M 10/052; H01M 2300/0085; C08H 6/00; H01G 11/48; H01G 11/56; H01G 11/62; H01G 11/86
See application file for complete search history.

(56) References Cited

U.S. PATENT DOCUMENTS 5,202,009 A * 4/1993 Andrieu ................. C08L 63/00
                                                        521/27

OTHER PUBLICATIONS

Supporting information for Wang, Shi, et al. "Polymer-laden composite lignin-based electrolyte membrane for high-performance lithium batteries." ACS Sustainable Chemistry & Engineering 6.11 (2018): 14460-14469. (Year: 2018).*

(Continued)

*Primary Examiner* — Sarah A. Slifka
(74) *Attorney, Agent, or Firm* — NSIP Law

(57) ABSTRACT

Lignin gel-based electrolyte is disclosed. The lignin gel-based electrolyte includes a lignin polymer network containing lignin molecules and a crosslinking agent to crosslink the lignin molecules; and liquid electrolyte contained within the lignin polymer network. The lignin gel-based electrolyte may have high ionic conductivity and maintain excellent mechanical stability.

13 Claims, 14 Drawing Sheets

(56) References Cited

OTHER PUBLICATIONS

Uddin, Md-Jamal, et al. "A low-cost, environment-friendly lignin-polyvinyl alcohol nanofiber separator using a water-based method for safer and faster lithium-ion batteries." Materials Science and Engineering: B 223 (2017): 84-90. (Year: 2017).*

Zhang, Wu, et al. "Three-dimensional nitrogen-doped hierarchical porous carbon derived from cross-linked lignin derivatives for high performance supercapacitors." Electrochimica Acta 282 (2018): 642-652. (Year: 2018).*

Jin, Juan, et al. "Lignin-based electrospun carbon nanofibrous webs as free-standing and binder-free electrodes for sodium ion batteries." Journal of Power Sources 272 (2014): 800-807. (Year: 2014).*

Tenhaeff, Wyatt E., et al. "Highly robust lithium ion battery anodes from lignin: an abundant, renewable, and low-cost material." Advanced Functional Materials 24.1 (2014): 86-94. (Year: 2014).*

Nishida, Mitsukuni, Yasumitsu Uraki, and Yoshihiro Sano. "Lignin gel with unique swelling property." Bioresource technology 88.1 (2003): 81-83. (Year: 2003).*

Lei, Danyun, et al. "NiCo2O4 nanostructure-decorated PAN/lignin based carbon nanofiber electrodes with excellent cyclability for flexible hybrid supercapacitors." Polymer 132 (2017): 31-40. (Year: 2017).*

Peng, Zhiyuan, et al. "High-performance biomass-based flexible solid-state supercapacitor constructed of pressure-sensitive lignin-based and cellulose hydrogels." ACS applied materials & interfaces 10.26 (2018): 22190-22200. (Year: 2018).*

Hu, Sixiao, et al. "High energy density supercapacitors from lignin derived submicron activated carbon fibers in aqueous electrolytes." Journal of Power Sources 270 (2014): 106-112. (Year: 2014).*

Wang et al., "Polymer-Laden Composite Lignin-Based Electrolyte Membrane for High-Performance Lithium Batteries," ACS Sustainable Chemistry & Engineering, 2018, pp. 14460-14469.

Liu et al., "A high-performance and environment-friendly gel polymer electrolyte for lithium ion battery based on composited lignin membrane," J Solid State Electrochem, 2018, pp. 807-816.

* cited by examiner

[FIG. 1]
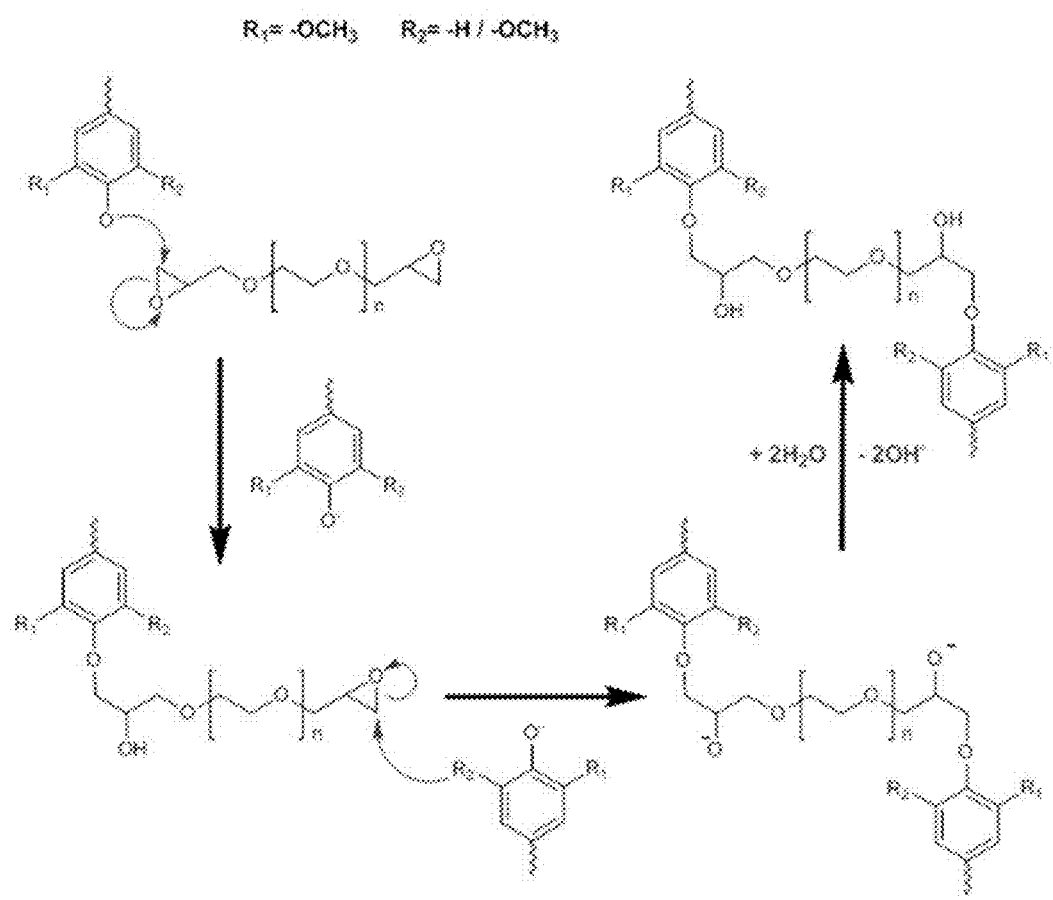

[FIG. 2]
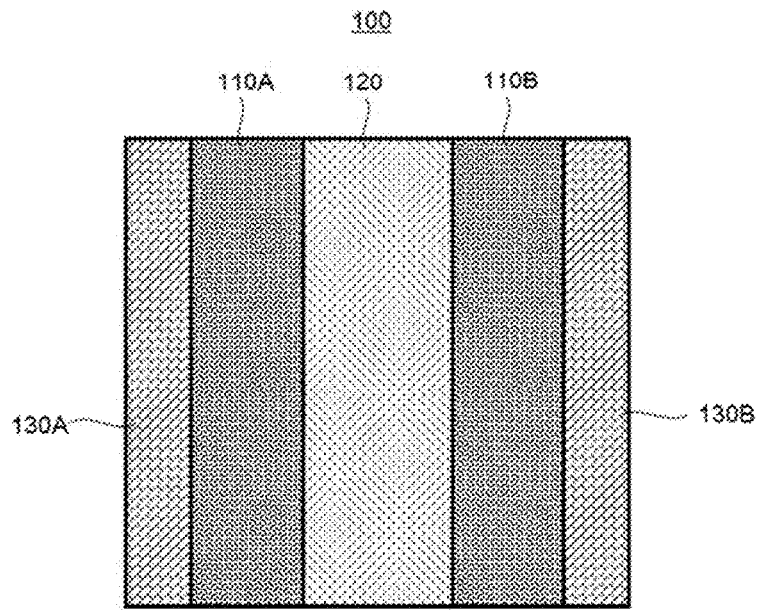
[FIG. 3A]
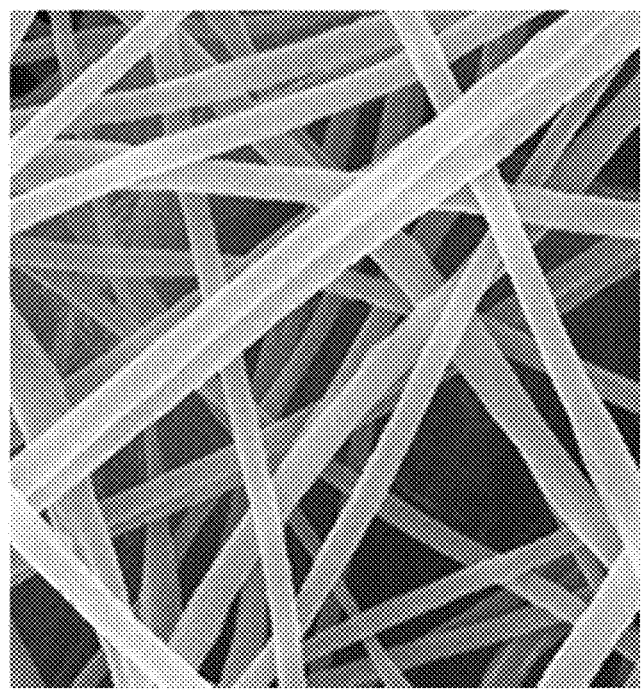

[FIG. 3B]
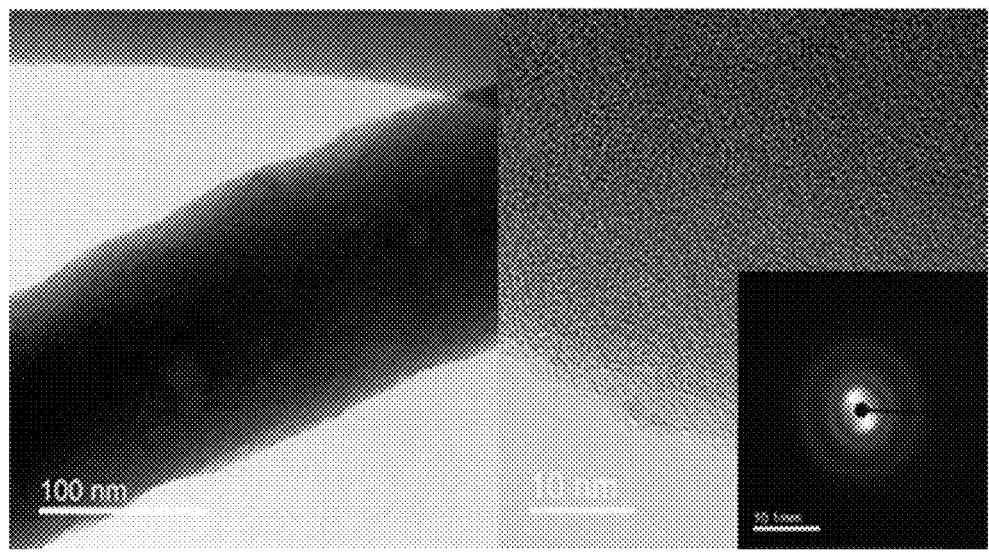
[FIG. 3C]
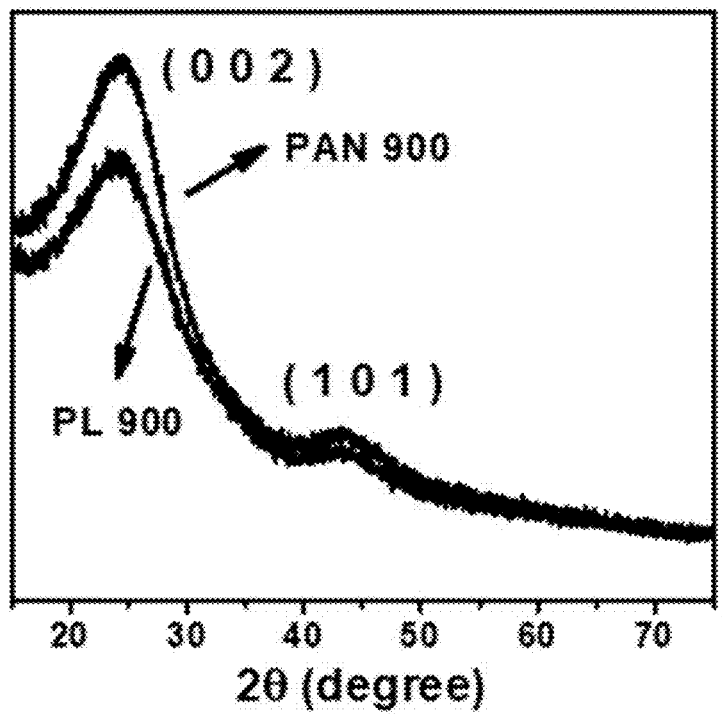

[FIG. 3D]
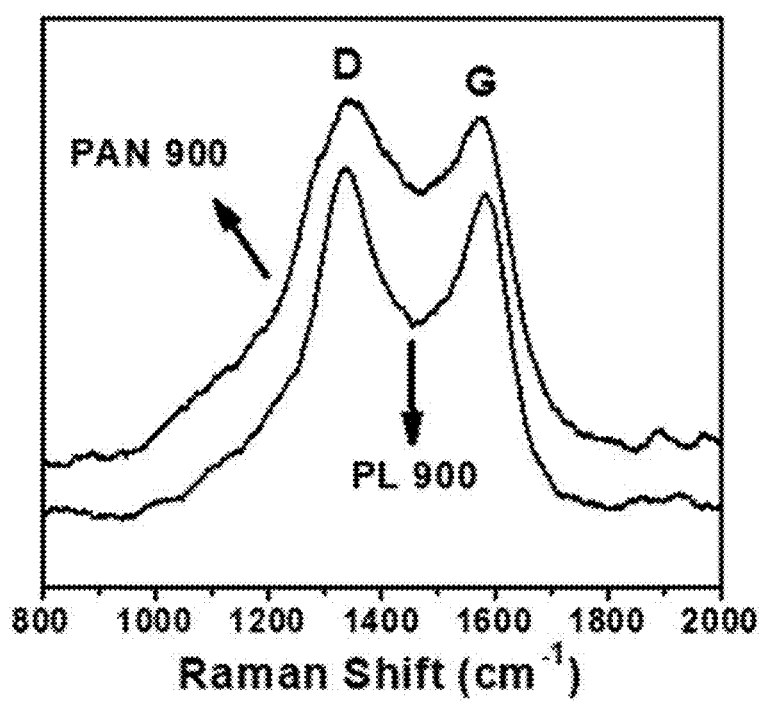
[FIG. 3E]
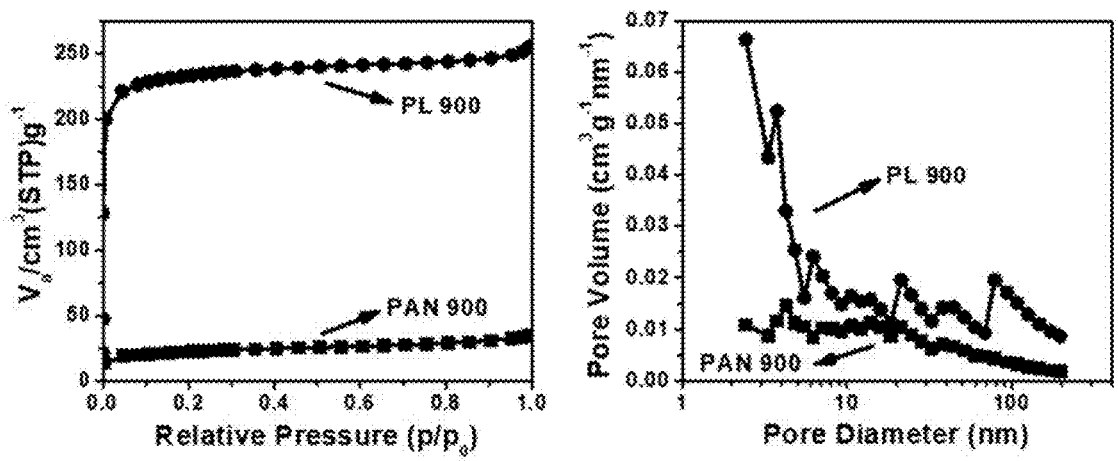

[FIG. 4]
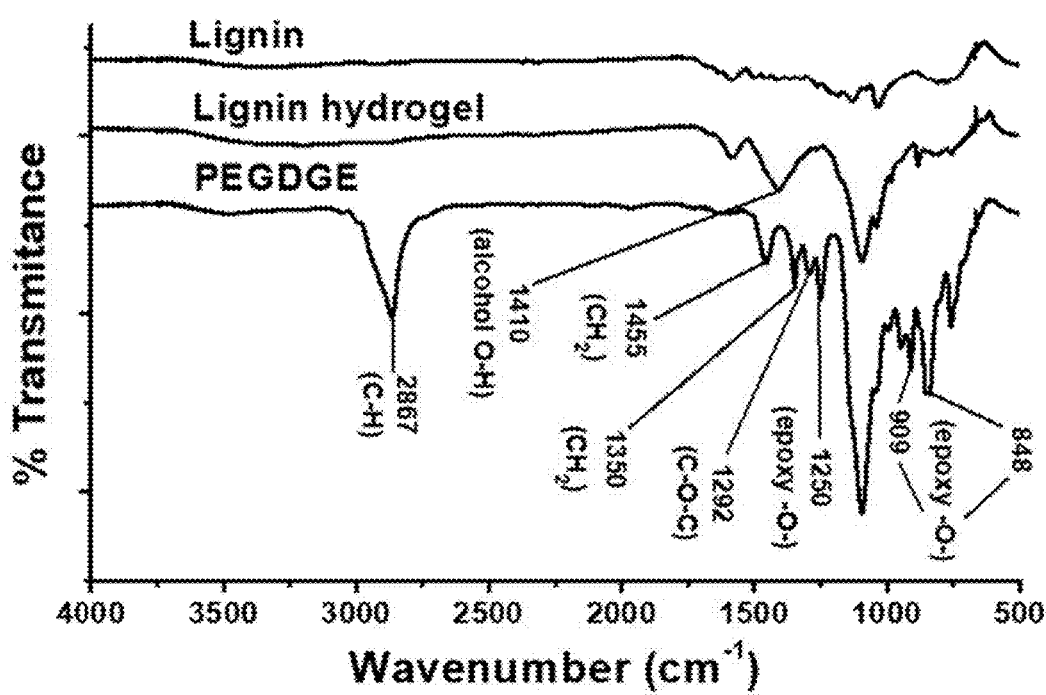

[FIG. 5A]
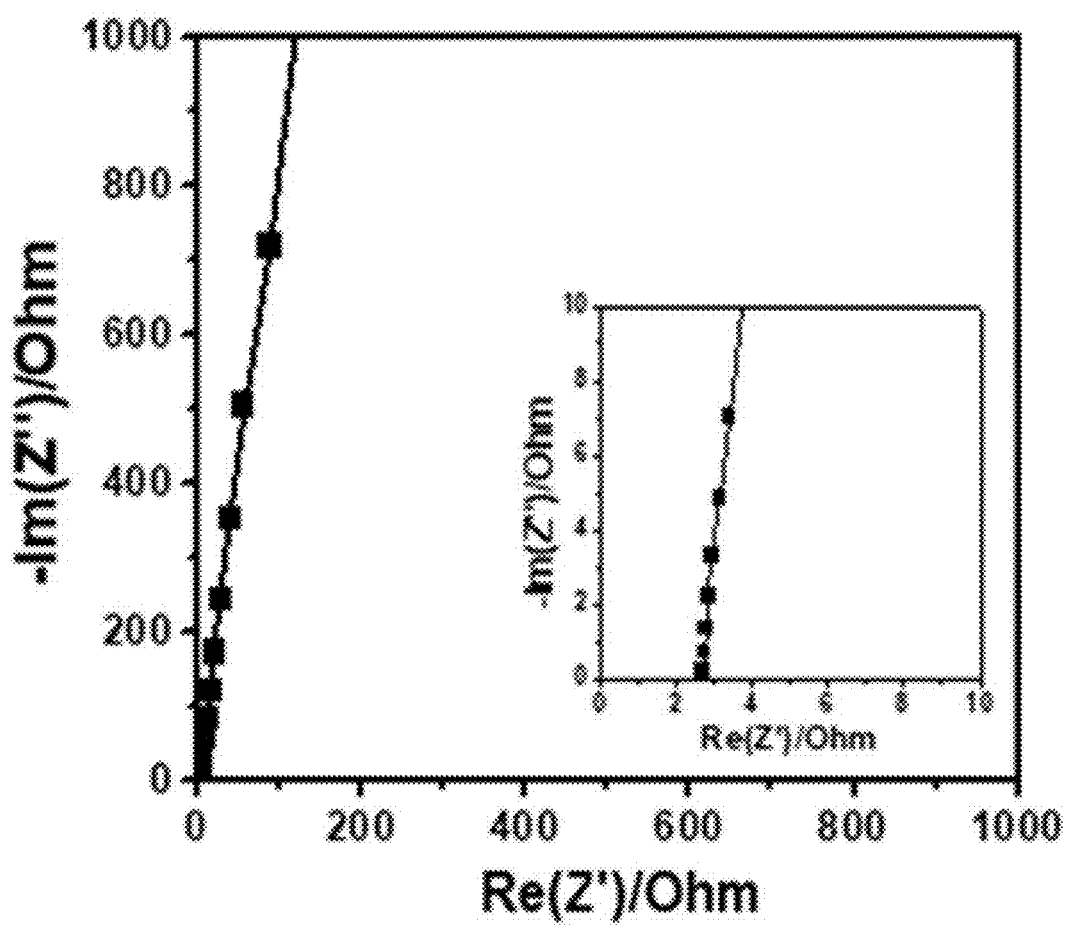

[FIG. 5B]
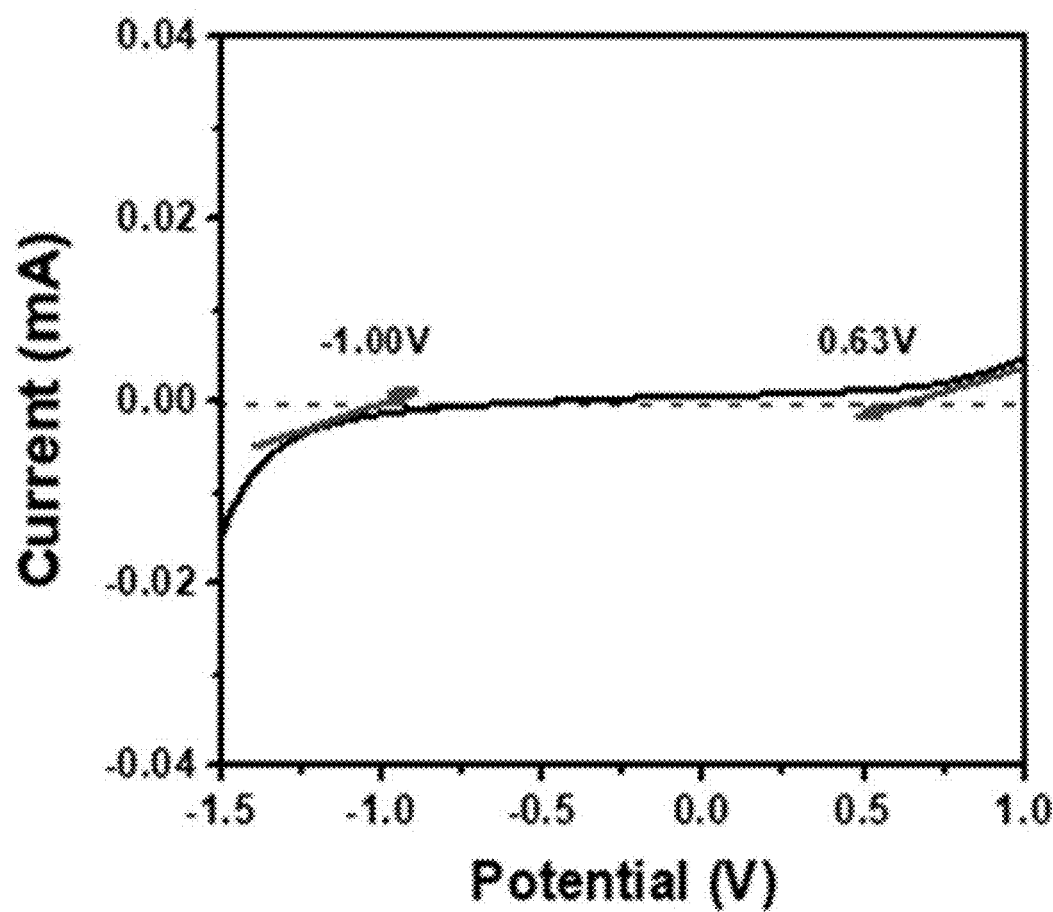

[FIG. 6A]
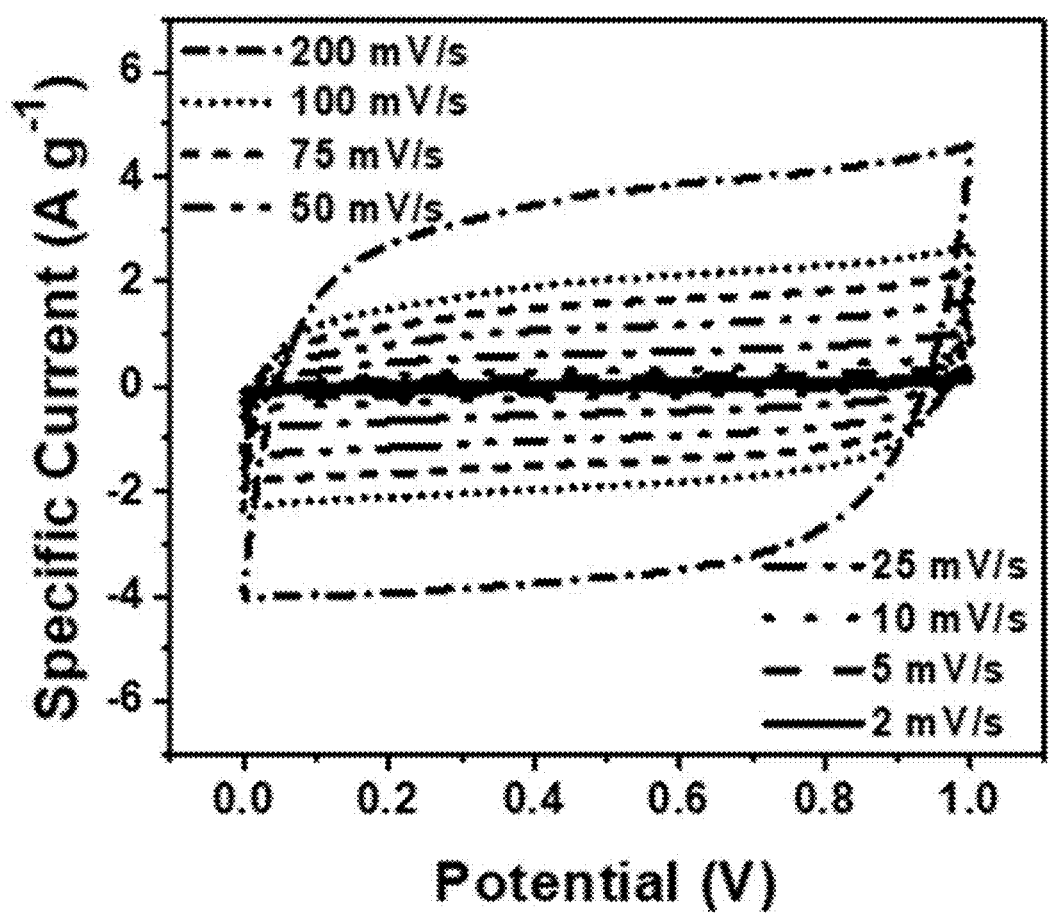

[FIG. 6B]
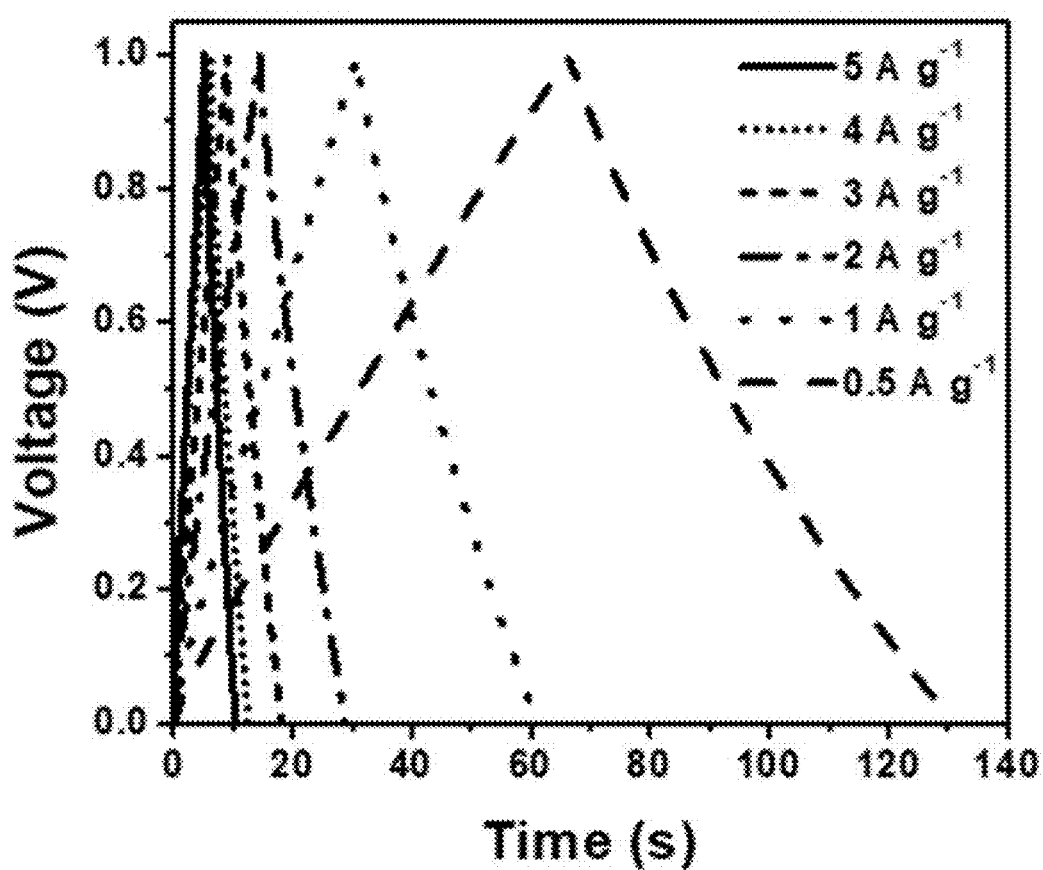

[FIG. 6C]
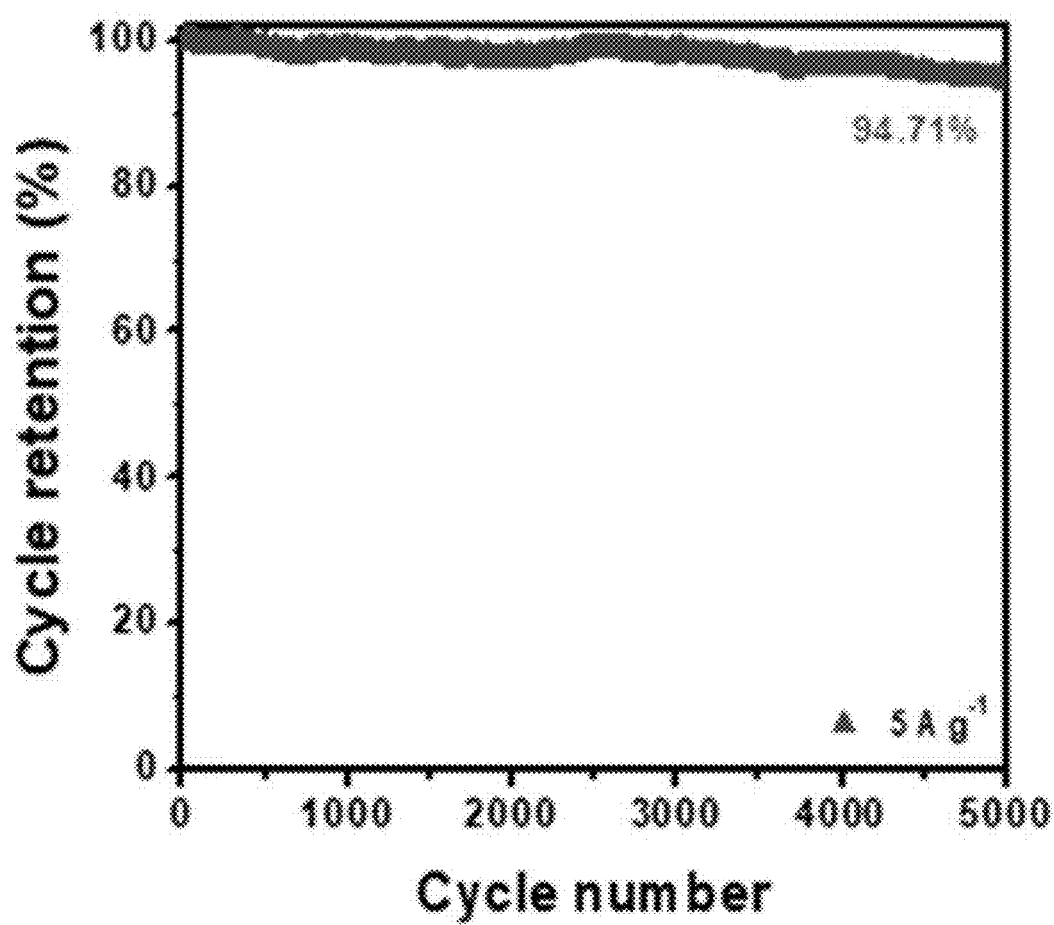

[FIG. 7A]
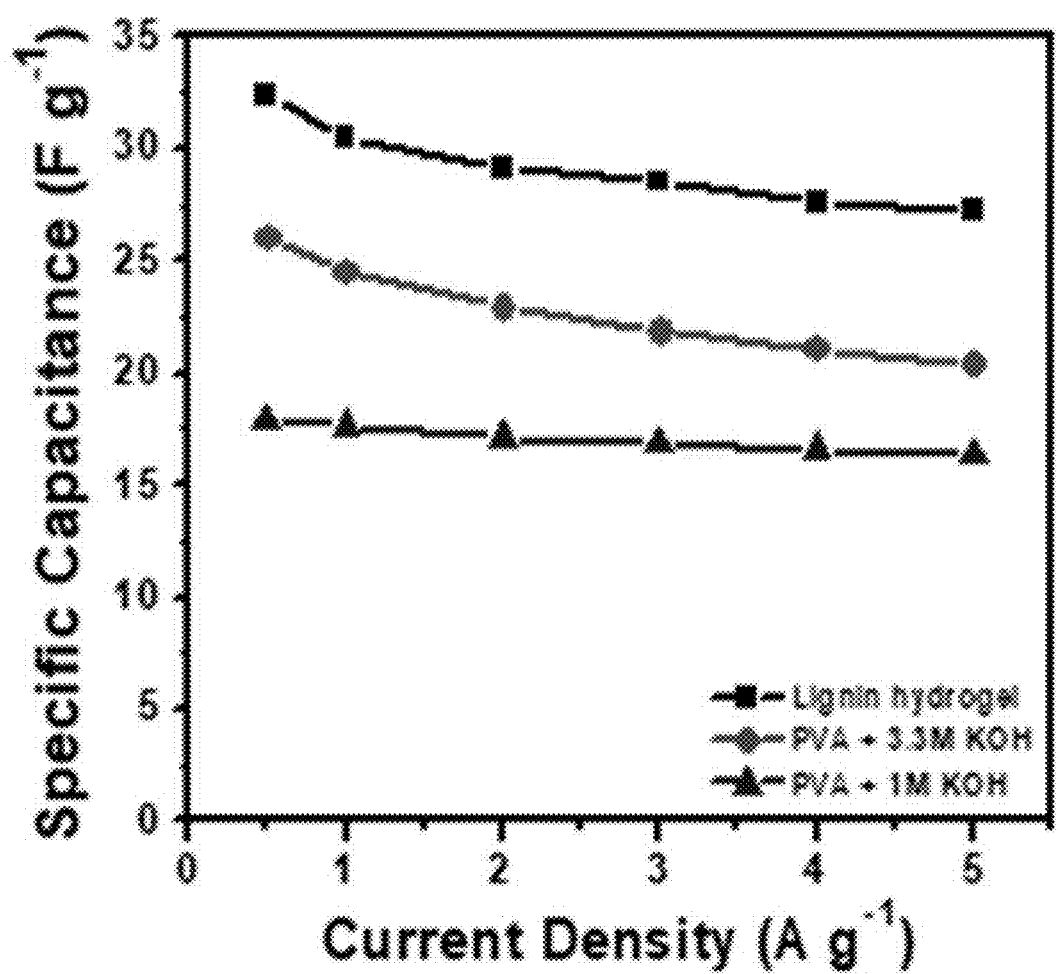

[FIG. 7B]
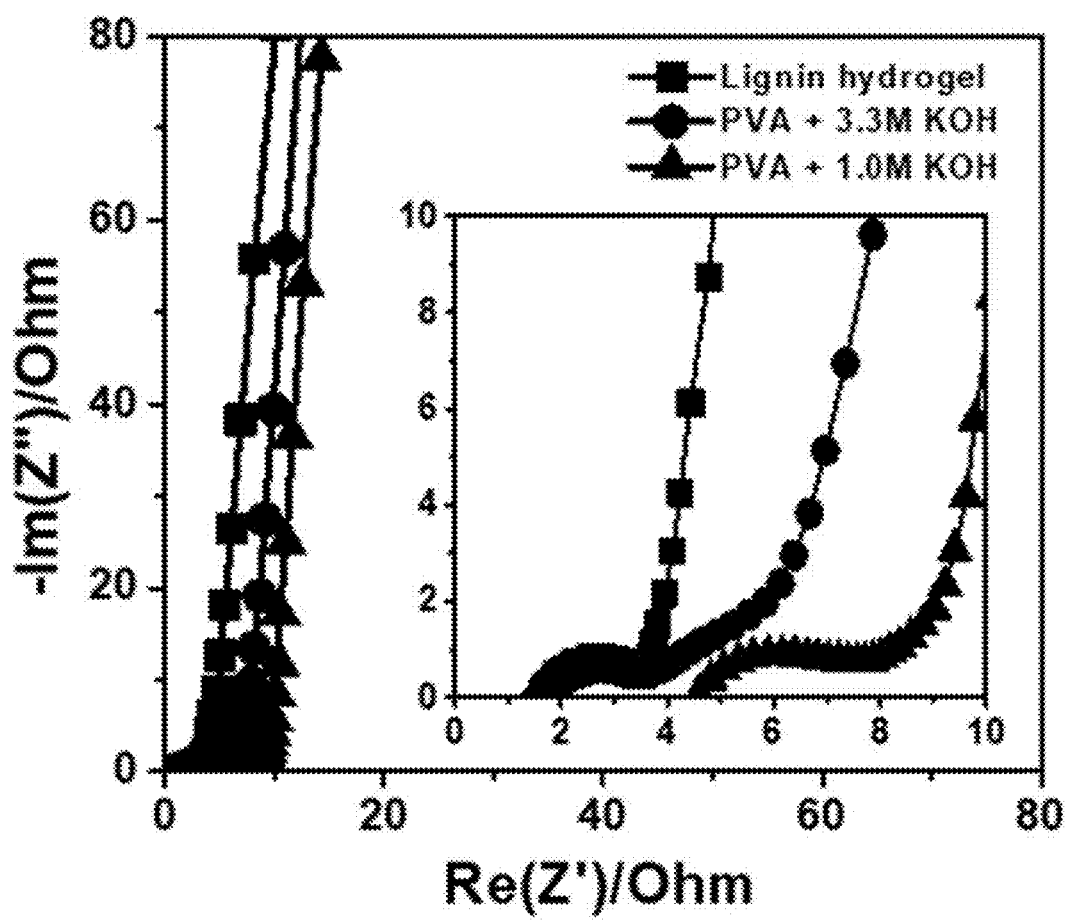

[FIG. 8A]
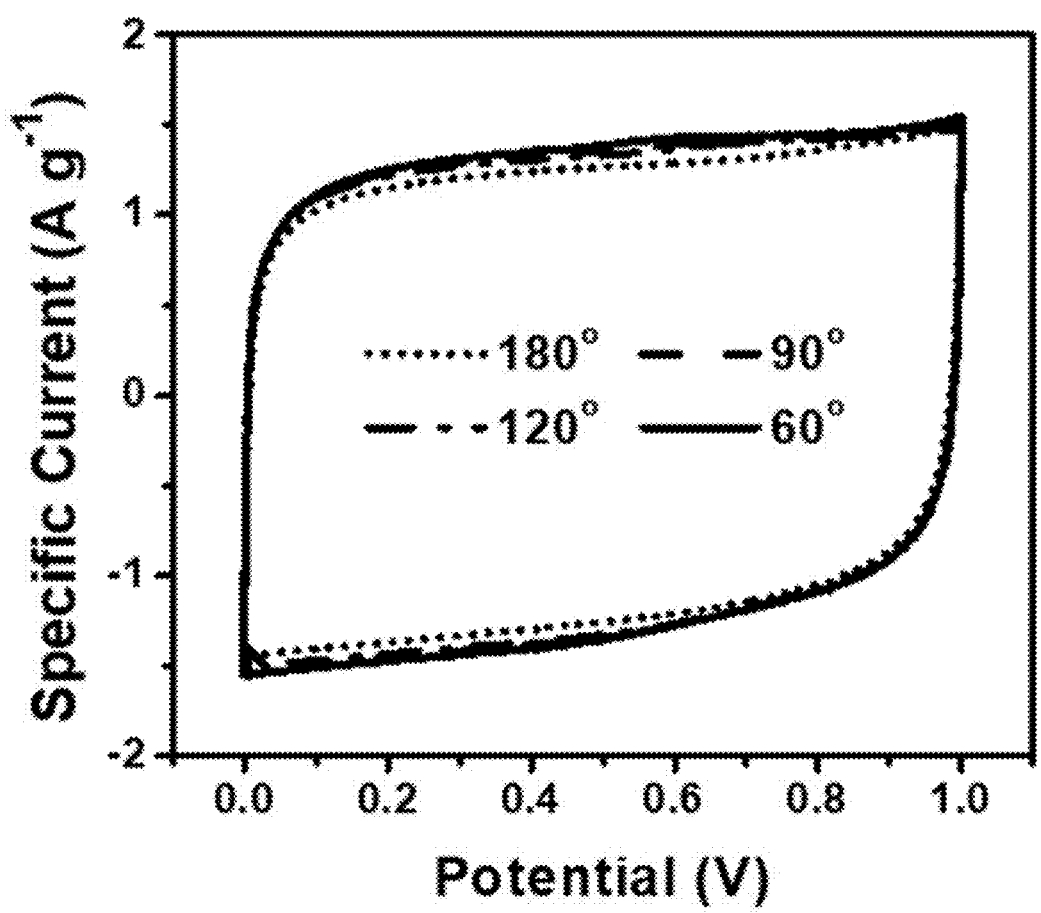

[FIG. 8B]
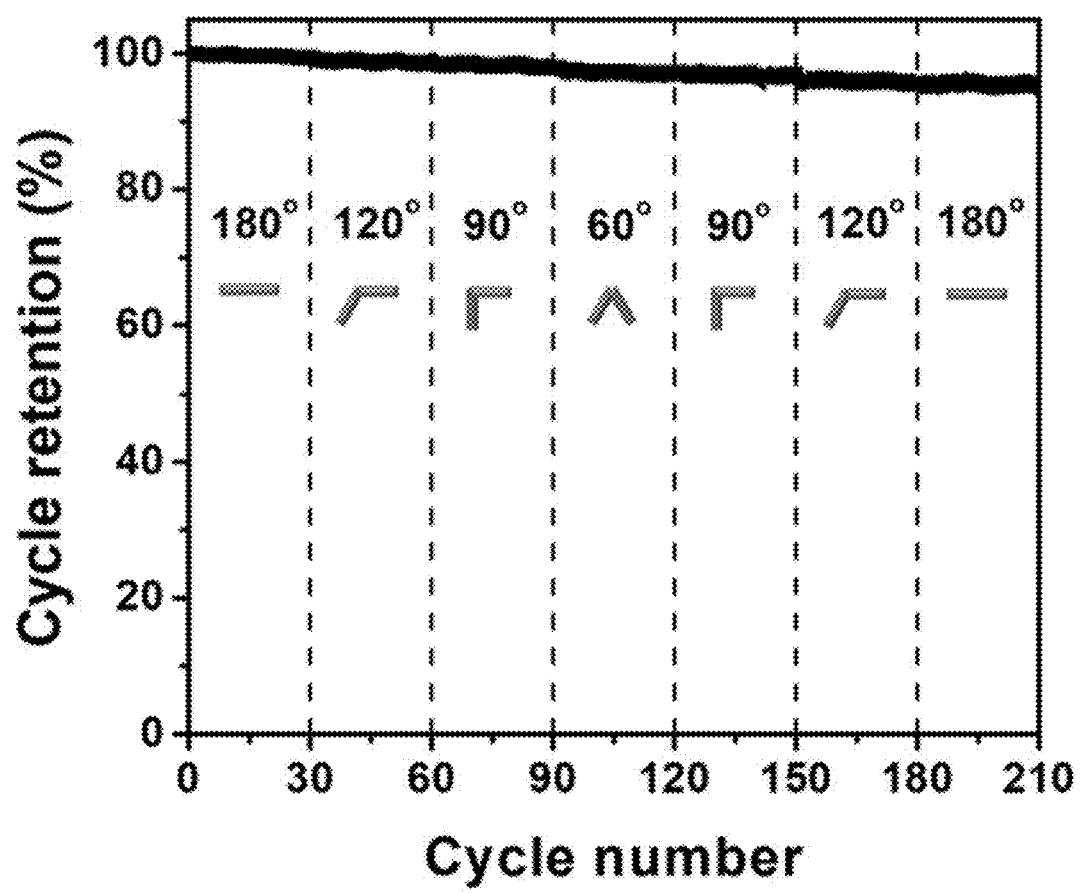

LIGNIN GEL ELECTROLYTE, METHOD OF THE LIGNIN GELL ELECTROLYTE, AND ENERGY STORING APPARATUS INCLUDING THE LIGNIN GELL ELECTROLYTE

CROSS-REFERENCE TO RELATED APPLICATIONS

This application claims the benefit under 35 USC § 119(a) of Korean Patent Application No. 10-2018-0141869 filed on Nov. 16, 2018 in the Korean Intellectual Property Office, the entire disclosure of which is incorporated herein by reference for all purposes.

BACKGROUND

1. Field

The present disclosure relates to lignin gel-based electrolyte with improved mechanical properties and improved ionic conductivity and to an energy storage containing the same.

2. Description of Related Art

As IoT and ICT technologies are popular, importance of next-generation flexible or wearable electronic devices is emerging. However, a deformable energy storage system is the biggest technical obstacle in terms of performance and stability of the flexible or wearable electronic devices.

In order to overcome instability and leakage of liquid electrolyte, a lot of research has been conducted on entirely-solid or semi-solid electrolytes. Existing materials thereof have limitations in satisfying electrochemical, mechanical and thermal properties required for electrolyte for the flexible energy storage. In addition, a conventional flexible energy storage using the entirely-solid or semi-solid electrolyte that has solved the instability problem has excellent performance under a normal room temperature condition. However, under an extreme condition such as very high temperature, the conventional storage has a limited performance due to decomposition of the electrolyte and instability of a separator. Thus, solving this problem becomes a big challenge.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide lignin gel-based electrolyte containing a cross-linked lignin polymer network and thus having improved mechanical properties and improved ionic conductivity.

Another purpose of the present disclosure is to provide a preparation method of the lignin gel-based electrolyte.

Another purpose of the present disclosure is to provide an energy storage containing the lignin gel-based electrolyte.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides lignin gel-based electrolyte comprising: a lignin polymer network containing lignin molecules and a crosslinking agent to crosslink the lignin molecules; and liquid electrolyte contained within the lignin polymer network.

In one implementation of the lignin gel-based electrolyte, each of the lignin molecules includes an alkaline lignin compound or a lignin sulfonate compound having a molecular weight of 10000 to 20000.

In one implementation of the lignin gel-based electrolyte, the crosslinking agent contains an epoxy group or a vinyl group at each of both ends thereof, wherein the epoxy group or a vinyl group reacts with a hydroxyl group (—OH) of a phenol group of the lignin molecule or with oxygen (—O—) of a phenolate group derived therefrom to form a chemical bond.

In one implementation of the lignin gel-based electrolyte, the crosslinking agent includes ethylene glycol diglycidyl ether.

In one implementation of the lignin gel-based electrolyte, the liquid electrolyte includes ionic liquid electrolyte, organic electrolyte or aqueous electrolyte.

In one implementation of the lignin gel-based electrolyte, the liquid electrolyte includes an aqueous solvent, an organic solvent or an ionic liquid solvent in which potassium hydroxide or sodium hydroxide is dissolved.

Another aspect of the present disclosure provides an energy storage comprising: a first electrode; a second electrode facing away the first electrode; and lignin gel-based electrolyte interposed between the first and second electrodes, the lignin gel-based electrolyte including: a lignin polymer network containing lignin molecules and a crosslinking agent to crosslink the lignin molecules; and liquid electrolyte contained within the lignin polymer network.

In one implementation of the energy storage, at least one of the first electrode or the second electrode includes a fiber electrode, wherein the fiber electrode is prepared by: mixing lignin molecules with at least one polymer compound selected from a group consisting of polyacrylonitrile (PAN), polyethylene oxide (PEO) and polyvinylpyrrolidone (PVP) to form a spinning target solution; electrospinning the spinning target solution to form an electrospun product; and thermally treating the electrospun product.

In one implementation of the energy storage, thermally treating the electrospun product includes: a first thermal treatment at 200 to 300° C. temperature in an oxygen atmosphere; and a second thermal treatment at 800 to 1000° C. temperature in an inert gas atmosphere.

In one implementation of the energy storage, the spinning target solution contains 25 to 900 parts by weight of the polymer compound based on 100 parts by weight of the lignin molecule.

In one implementation of the energy storage, the fiber electrode contains a fiber having an average diameter of 50 to 500 nm and has a porous fiber mat structure having a thickness of 10 to 200 μm.

Effects of the present disclosure may be as follows but may not be limited thereto.

According to the lignin gel-based electrolyte in accordance with the present disclosure, the lignin molecule and the crosslinking agent chemically react each other to form a diol compound. Thus, the lignin gel-based electrolyte may absorb a large amount of aqueous electrolyte, and may not only exhibit excellent ionic conductivity characteristics, but also may maintain excellent mechanical stability although absorbing a large amount of aqueous electrolyte.

In the energy storage in accordance with the present disclosure, the lignin gel-based electrolyte and the fiber electrode having the lignin-polymer fiber mat structure are bonded to each other, to improve interfacial properties between the fiber electrode and the electrolyte.

In addition to the effects as described above, specific effects of the present disclosure will be described together with the detailed description for carrying out the disclosure.

BRIEF DESCRIPTION OF DRAWINGS

FIG. 1 illustrates lignin gel-based electrolyte according to an embodiment of the present disclosure.

FIG. 2 illustrates an energy storage according to an embodiment of the present disclosure.

FIG. 3A and FIG. 3B show SEM and TEM images of a fiber electrode prepared according to Present example, respectively. FIG. 3C and FIG. 3D show XRD data and Raman spectra for the fiber electrode prepared according to the Present Example, and for a PAN fiber electrode prepared by electrospinning a polyacrylonitrile (PAN) solution according to Comparative Example, respectively. FIG. 3E is a graph showing a surface area and a pore size measured for the fiber electrode prepared according to the Present Example, and for a PAN fiber electrode prepared by electrospinning a polyacrylonitrile (PAN) solution according to Comparative Example, FIG. 4 shows FT-IR data for lignin, a crosslinking agent (PEGDGE) and lignin gel-based electrolyte prepared according to Present Example.

FIG. 5A and FIG. 5B show Nyquist plot and LSV data for lignin gel-based electrolyte prepared according to Present Example, respectively.

FIG. 6A to FIG. 6C show results of a current-voltage (CV) graph, a GCD graph, and a cycle stability test, respectively, for a supercapacitor prepared according to Present Example.

FIG. 7A and FIG. 7B are respectively capacitance and impedance graphs measured for a supercapacitor ('Lignin hydrogel') prepared according to Present Example, a supercapacitor ('PVA+3.3M KOH') according to Comparative Example 1 containing gel electrolyte with 3.3M KOH impregnated into a PVA polymer chain, and a supercapacitor ('PVA+1.0M KOH') according to Comparative Example 2 containing gel electrolyte with 1.0 M KOH impregnated in the PVA polymer chain.

FIG. 8A and FIG. 8B show a current-voltage (CV) graph and a cycle stability measurement, respectively, measured at different bending angles for a supercapacitor prepared according to Present Example.

DETAILED DESCRIPTIONS

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates lignin gel-based electrolyte according to an embodiment of the present disclosure.

Referring to FIG. 1, the lignin gel-based electrolyte according to an embodiment of the present disclosure contains a lignin polymer network and liquid electrolyte.

The lignin polymer network may contain lignin molecules and a crosslinking agent that crosslinks the lignin molecules.

Each of the lignin molecules may be a polymer compound containing at least one of a monomer of a following Chemical Formula 1-1, a monomer of a following Chemical Formula 1-2, and a monomer of a following Chemical Formula 1-3. In one embodiment, each of the lignin molecules may have a molecular weight of about 10,000 or greater and 20,000 or smaller.

[Chemical Formula 1-1]

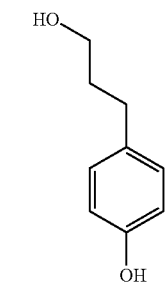

Coumaryl alcohol

[Chemical Formula 1-2]

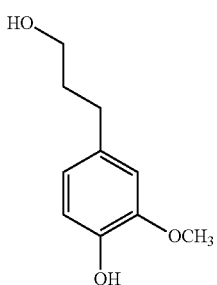

Coniferyl alcohol

[Chemical Formula 1-3]

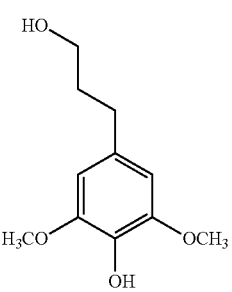

Syringyl alcohol

In one embodiment, each of the lignin molecules may include an alkali lignin compound or a lignin sulfonate compound. For example, each of the lignin molecules may include an alkali lignin compound having a molecular structure of a following Chemical Formula 2-1 or a lignin sulfonate compound having a molecular structure of a following Chemical Formula 2-2.

[Chemical Formula 2-1]

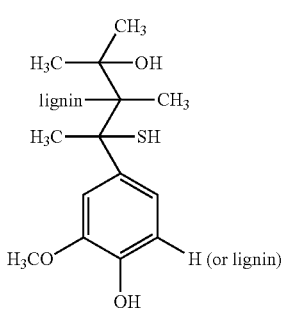

[Chemical Formula 2-2]

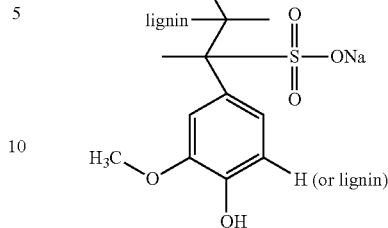

The crosslinking agent may be a compound having a functional group at each of both ends thereof that may react with a hydroxyl group (—OH) of a phenol group of a lignin molecule or oxygen (—O—) of a phenolate group derived therefrom to form a chemical bond. In this case, the functional group may include an epoxy group or a vinyl group. For example, the crosslinking agent may include at least one selected from a group consisting of methylenebisacrylamide (MBAA), ethylene glycol dimethacrylate, ethylene glycol diglycidyl ether, hexanediol diacrylate, N,N-diallylacrylamide, divinylbenzene, and the like. The crosslinking agent may include a compound having a polymerization degree of about 10 to 25.

Preferably, in order to stably absorb a basic solution in a large amount, a compound having a linear chain structure having an epoxy group at each of both ends may be used as the crosslinking agent. For example, ethylene glycol diglycidyl ether of a following Chemical Formula 3 may be used as the crosslinking agent.

[Chemical Formula 3]

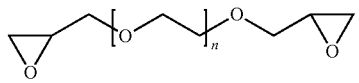

In the Chemical Formula 3, n is an integer from 10 to 25.

In one embodiment, as shown in FIG. 1, when ethylene glycol diglycidyl ether having an epoxy group at each of both ends is used as the crosslinking agent, each of the epoxy groups at both ends of the ethylene glycol diglycidyl ether reacts with oxygen of a phenolate group of the lignin molecule to form a chemical bond. Thus, the lignin molecules and the crosslinking agent may form a three-dimensional network.

In one embodiment, a degree of crosslinking of the lignin polymer network may be in a range of about $5 \times 10^{-7}$ mol/cm$^3$ to $5 \times 10^{-5}$ mol/cm$^3$.

The liquid electrolyte may include an ionic liquid, an organic electrolyte, an aqueous electrolyte, or the like, known liquid electrolyte materials may be used for the liquid electrolyte without limitation. For example, the ionic liquid may be one selected from imidazolium based ionic liquids BIMI: BF4, EMIM: TFSI, EMIM: BF4 and the like. A known organic electrolyte material may be used for the organic electrolyte without limitation. For example, the organic electrolyte may contain an organic solvent and a salt such as LiBF$_4$, LiClO$_4$, LiPF$_6$, LiAsF$_6$, LiCF$_3$SO$_3$, LiN(SO$_2$CF$_3$)$_2$, LiN(SO$_2$C$_2$F$_5$)$_2$, LiC(SO$_2$CF$_3$)$_2$, and LiB(C$_2$H$_5$)$_4$ dissolved therein. A known aqueous electrolyte material may be used for the aqueous electrolyte without limitation. For example, the aqueous electrolyte may include an aqueous solution of sulfuric acid, phosphoric acid, potassium hydroxide, sodium hydroxide and the like.

In one embodiment, when the lignin polymer network has a structure in which the lignin molecules are crosslinked with each other via the crosslinking agent having epoxy groups at both ends thereof, the lignin polymer network has abundant oxygen-containing functional groups. Thus, the lignin polymer network may stably absorb a basic solution to realize high ionic conductivity. Therefore, in this case, the liquid electrolyte may include an aqueous solution of potassium hydroxide (KOH) or sodium hydroxide (NaOH).

In an embodiment of the present disclosure, the lignin gel-based electrolyte is prepared by mixing lignin molecules with a basic aqueous solution to swell the lignin molecules, adding the crosslinking agent thereto, and reacting the lignin molecules with the crosslinking agent at room temperature. In this case, the lignin gel-based electrolyte contains a basic aqueous solution as the liquid electrolyte.

In one example, when the lignin gel-based electrolyte prepared by the above method is neutralized with an acidic solution such as sulfuric acid or acetic acid, and then impregnated into another aqueous electrolyte, the liquid electrolyte contained in the lignin gel-based electrolyte may be changed.

In the lignin gel-based electrolyte according to the present disclosure, the chemical reaction between the lignin and the crosslinking agent may form diol. Thus, the lignin gel-based electrolyte may exhibit excellent ion conductivity characteristics while maintaining mechanical stability although absorbing an aqueous solvent.

According to an embodiment of the present disclosure, a method for preparing a fiber electrode may include a first step of preparing a spinning target solution by mixing lignin molecules and another polymer compound in an organic solvent and then electrospinning the spinning target solution to prepare a lignin-polymer nanofiber mat, and a second step of first thermally treating the lignin-polymer nanofiber mat in an oxygen atmosphere; and a third step of second thermally treating the first thermally treated lignin-polymer nanofiber mat to decompose the lignin molecules and graphitize at least a portion of the polymer.

In the first step, a compound having a molecular weight of about 10000 to 20000 may be used as the lignin molecule. The polymer compound may include at least one selected from a group consisting of polyacrylonitrile (PAN), polyethylene oxide (PEO), polyvinylpyrrolidone (PVP) represented by following Chemical Formula 4-1 to Chemical Formula 4-3 respectively. The organic solvent may include at least one selected from a group consisting of dimethylformamide (DMF), dimethylsulfoxide (DMSO), and dimethylacetamide (DMAC).

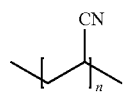

[Chemical Formula 4-1]

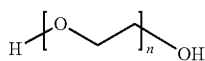

[Chemical Formula 4-2]

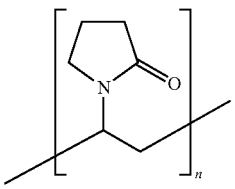

[Chemical Formula 4-3]

In one embodiment, in the spinning target solution, about 25 to 900 parts by weight of the polymer compound may be mixed with 100 parts by weight of the lignin molecules. When a content of the polymer compound is smaller than 25 parts by weight, a viscosity of the spinning target solution may be low, thus making it difficult to perform electrospinning of the spinning target solution. When the content of the polymer compound exceeds 900 parts by weight, a content of the lignin may be too small, resulting in a problem of lowering ion conductivity.

In one example, the spinning target solution may have a concentration of about 8 to 20% by weight. A spinning voltage and a scan rate for the electrospinning may be appropriately controlled. For example, the lignin-polymer nanofiber mat having a thickness of about 10 to 200 μm may be prepared by electrospinning the spinning target solution at a spinning voltage of about 12 to 17 kV and a scanning rate of about 0.2 to 0.5 ml/hr.

In the second step, the lignin-polymer nanofiber mat may be subjected to the first thermal treatment in which a temperature may increase to about 200 to 300° C. in an oxygen atmosphere and the mat is maintained therein for a certain time. When this first thermal treatment is executed, an oxygen functional group may be introduced into the lignin-polymer nanofiber mat to stabilize the lignin-polymer nanofiber mat. In one embodiment, the lignin-polymer nanofiber mat is placed in a chamber. Then, the method injects oxygen into the chamber and increases a temperature of the chamber to a temperature of about 250° C. at a rate of about 4 to 7° C./min. Then, the mat is maintained at a temperature of about 250° C. for about 1 to 2 hours. In this way, the first thermal treatment of the lignin-polymer nanofiber mat may be performed.

In the third step, the first thermally treated lignin-polymer nanofiber mat may be subjected to the second thermal treatment in which the temperature increases to about 850 to 1000° C. and then the mat is maintained for a certain time in an inert gas atmosphere. When this high temperature second thermal treatment is executed, the lignin molecules may be degraded and at least a portion of the polymer compound may be graphitized.

The fiber electrode prepared as described above may have high power characteristics due to inducing of decomposition of the lignin by the thermal treatment without a separate physical/chemical activation step. Further, the fiber electrode prepared as described above may act as a freestanding porous fiber electrode material that does not require a binder and a conductive material.

FIG. 2 illustrates an energy storage according to an embodiment of the present disclosure.

Referring to FIG. 2, an energy storage 100 according to an embodiment of the present disclosure may include a first electrode 110A, a second electrode 110B, and electrolyte 120. The energy storage 100 may be embodied as, for example, a supercapacitor or a lithium secondary battery.

The first electrode 110A and the second electrode 110B may face away each other in a spaced state therebetween.

In one embodiment, at least one of the first electrode 110A and the second electrode 110B may include the fiber electrode as described above. For example, each of both the first electrode 110A and the second electrode 110B may be embodied as the fiber electrode. Alternatively, the first electrode 110A may be embodied as the fiber electrode, while the second electrode 110B may be made of a known porous carbon material.

The electrolyte 120 may be disposed between the first electrode 110A and the second electrode 110B, and may include the lignin gel-based electrolyte as described above.

In one example, when the energy storage (100) according to an embodiment of the present disclosure is embodied as a supercapacitor, the energy storage 100 may further include a first current collector 130A electrically connected to the first electrode 110A and a second current collector 130B electrically connected to the second electrode 110B. A known structure and material of a current collector for a supercapacitor may be applied, without limitation, to the first current collector 130A and the second current collector 130B. Thus, a detailed description thereof will be omitted.

Hereinafter, specific Present Examples and Experimental Examples according to the present disclosure will be described in detail. However, the following Present Examples are only an embodiment of the present disclosure, and a scope of the present disclosure is not limited to the following Present Examples.

[Fiber Electrode Preparation]

Alkali lignin molecules and polyacrylonitrile (PAN) were added to DMF (dimethylformamide) and mixed with each other to prepare an electrospinning target solution with a concentration of 15%. The electrospinning target solution was electrospun at 15 kV spinning voltage and a scanning rate of 0.3 ml/hr to prepare a lignin-polymer nanofiber mat having a thickness of about 50 μm.

Subsequently, the lignin/polymer nanofiber mat was placed in a chamber. Then, oxygen gas was injected into the chamber, and at the same time, a temperature was raised to a temperature of 250° C. at a rate of 5° C./min, and the mat is maintained therein for 1 hour. This is the first thermal treatment. Thereafter, the mat was slowly cooled to room temperature.

Subsequently, the first thermally treated lignin/polymer nanofiber mat was placed inside the chamber, and then the chamber was heated to a temperature of 900° C. at a rate of 5° C./min in an argon gas atmosphere, and then the mat was maintained in the chamber for 1 hour to perform the second thermal treatment. After the second thermal treatment, the mat was cooled slowly to room temperature. In this way, the fiber electrode was prepared. The fiber electrode subjected to the second thermal treatment was present in a form of a black porous film.

[Preparation of Lignin Gel-Based Electrolyte]

30 g of aqueous 3.3 M potassium hydroxide solution was mixed with 10 g of alkali lignin having a molecular weight of 10000 or greater, and then the mixture was subjected to vigorous stirring for 24 hours. Subsequently, 6 ml of PEGDGE (poly(ethylene glycol)diglycidyl ether) solution having a polymerization degree of 13 to 22 was added to the mixed solution which in turn was stirred for 30 minutes, and was left at room temperature for at least 24 hours to prepare lignin electrolyte gel in a film form.

[Preparation of Supercapacitor]

After coating a gold (Au) current collector on a PET film, the fiber electrode was coated on the collector to form an electrode plate. Then, the lignin gel-based electrolyte was interposed between two electrode plates to prepare a supercapacitor.

Experimental Example

FIG. 3A and FIG. 3B show SEM and TEM images of a fiber electrode prepared according to Present example, respectively. FIG. 3C and FIG. 3D show XRD data and Raman spectra for the fiber electrode prepared according to the Present Example, and for a PAN fiber electrode prepared by electrospinning a polyacrylonitrile (PAN) solution according to Comparative Example, respectively. FIG. 3E is a graph showing a surface area and a pore size measured for the fiber electrode prepared according to the Present Example, and for a PAN fiber electrode prepared by electrospinning a polyacrylonitrile (PAN) solution according to Comparative Example, Referring to FIG. 3A to FIG. 3D, it may be seen that the fiber electrode is composed of random bundles of fibers, resulting in low crystallinity.

Referring to FIG. 3E, it may be identified that the fiber electrode prepared according to Present Example has a significantly larger surface area and contains pores with a larger size therein than those of a PAN fiber electrode prepared according to Comparative Example.

FIG. 4 shows FT-IR data for lignin, a crosslinking agent (PEGDGE) and lignin gel-based electrolyte prepared according to Present Example.

Referring to FIG. 4 along with FIG. 1, the lignin gel-based electrolyte may be formed via the chemical reaction of the lignin and PEGDGE as the crosslinking agent.

FIG. 5A and FIG. 5B show Nyquist plot and LSV data for lignin gel-based electrolyte prepared according to Present Example, respectively.

Referring to FIG. 5A and FIG. 5B, it may be seen that the lignin gel-based electrolyte prepared according to Present Example has a low resistance value, a high ion conductivity, and excellent electrochemical stability.

FIG. 6A to FIG. 6C show results of a current-voltage (CV) graph, a GCD graph, and a cycle stability test, respectively, for a supercapacitor prepared according to Present Example.

Referring to FIG. 6A to FIG. 6C, it may be identified that the supercapacitor prepared according to the Present Example has excellent voltage-current characteristics and excellent capacitance showing high current density, and those performances are maintained for a long time.

FIG. 7A and FIG. 7B are respectively capacitance and impedance graphs measured for a supercapacitor ('Lignin hydrogel') prepared according to Present Example, a supercapacitor ('PVA+3.3M KOH') according to Comparative Example 1 containing gel electrolyte with 3.3M KOH impregnated into a PVA polymer chain, and a supercapacitor ('PVA+1.0M KOH') according to Comparative Example 2 containing gel electrolyte with 1.0 M KOH impregnated in the PVA polymer chain.

Referring to FIG. 7A and FIG. 7B, it may be seen that the supercapacitor prepared according to the Present Example has a higher capacitance and a lower impedance than those of the supercapacitors according to Comparative Examples 1 and 2.

FIG. 8A and FIG. 8B show a current-voltage (CV) graph and a cycle stability measurement, respectively, measured at different bending angles for a supercapacitor prepared according to Present Example.

Referring to FIG. 8A and FIG. 8B, it may be identified that the supercapacitor prepared according to the Present Example shows good capacity retention and long term cycle stability at different bending angles.

The illustrations of the presented embodiments are provided so that a person of ordinary skill in the art of the present disclosure may use or implement the present disclosure. Various modifications to these embodiments will be readily apparent to those skilled in the art of the present disclosure. The general principles defined herein may be applied to other embodiments without departing from the scope of the present disclosure. Thus, the present disclosure is not to be construed as limited to the embodiments set forth herein but rather to be accorded the widest scope consistent with the principles and novel features set forth herein.

What is claimed is:

1. Lignin gel-based electrolyte comprising:
a lignin polymer network containing lignin molecules and a crosslinking agent to crosslink the lignin molecules by a covalent bond between an epoxy group of the crosslinking agent and a hydroxy group of the lignin molecules; and
liquid electrolyte contained within the lignin polymer network,
wherein each of the lignin molecules includes a lignin sulfonate compound having a molecular weight of 10000 to 20000,
the lignin molecules each has a chemical structure corresponding to Formula A:

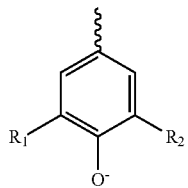

[Formula A]

wherein $R_1$=—$OCH_3$ and $R_2$=—H or —$OCH_3$, and
the covalent bond between the epoxy group of the crosslinking agent and the lignin molecules forms a diol.

2. The lignin gel-based electrolyte of claim 1, wherein the crosslinking agent contains the epoxy group at each of both ends thereof, wherein the epoxy group reacts with the hydroxyl group (—OH) of a phenol group of the lignin molecule to form the covalent bond.

3. The lignin gel-based electrolyte of claim 2, wherein the crosslinking agent includes ethylene glycol diglycidyl ether.

4. The lignin gel-based electrolyte of claim 2, wherein the liquid electrolyte includes ionic liquid electrolyte, organic electrolyte or aqueous electrolyte.

5. The lignin gel-based electrolyte of claim 4, wherein the liquid electrolyte includes an aqueous solvent, an organic solvent or an ionic liquid solvent in which potassium hydroxide or sodium hydroxide is dissolved.

6. The lignin gel-based electrolyte of claim 1, wherein a degree of crosslinking of the lignin polymer network is in a range of $5 \times 10^{-7}$ mol/cm$^3$ to $5 \times 10^{-5}$ mol/cm$^3$.

7. The lignin gel-based electrolyte of claim 1, wherein the covalent bond between the crosslinking agent and the lignin molecules is formed between the lignin molecules and a symmetric linear chain structure having an epoxy group at each of both ends thereof.

8. An energy storage comprising:
a first electrode;
a second electrode facing away the first electrode; and
lignin gel-based electrolyte interposed between the first and second electrodes, the lignin gel-based electrolyte including:
a lignin polymer network containing lignin molecules and a crosslinking agent to crosslink the lignin molecules by a covalent bond between an epoxy group of the crosslinking agent and a hydroxy group of the lignin molecules; and
liquid electrolyte contained within the lignin polymer network,
wherein the first electrode and the second electrode are fiber electrodes, and
the lignin molecules each has a chemical structure corresponding to Formula A:

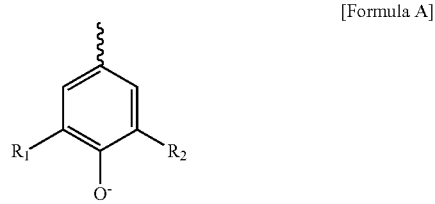

[Formula A]

wherein $R_1$=—$OCH_3$ and $R_2$=—H or —$OCH_3$, and
the covalent bond between the epoxy group of the crosslinking agent and the lignin molecules forms a diol.

9. The energy storage of claim 8, wherein at least one of the first electrode or the second electrode includes a fiber prepared by:
mixing lignin molecules with at least one polymer compound selected from a group consisting of polyacrylonitrile (PAN), polyethylene oxide (PEO) and polyvinylpyrrolidone (PVP) to form a spinning target solution;
electrospinning the spinning target solution to form an electrospun product; and
thermally treating the electrospun product.

10. The energy storage of claim 9, wherein thermally treating the electrospun product includes:
a first thermal treatment at 200 to 300° C. temperature in an oxygen atmosphere; and
a second thermal treatment at 800 to 1000° C. temperature in an inert gas atmosphere.

11. The energy storage of claim 9, wherein the spinning target solution contains 25 to 900 parts by weight of the polymer compound based on 100 parts by weight of the lignin molecule.

12. The energy storage of claim 9, wherein the at least one of the fiber electrode or the second electrode contains a fiber having an average diameter of 50 to 500 nm and has a porous fiber mat structure having a thickness of 10 to 200 μm.

13. The energy storage of claim 8, wherein the crosslinking agent comprises ethylene glycol diglycidyl ether.

* * * * *